(12) United States Patent
Harrison

(10) Patent No.: US 7,107,250 B2
(45) Date of Patent: Sep. 12, 2006

(54) APPARATUS FOR CREDENTIAL AUTHORISATION

(75) Inventor: Keith Alexander Harrison, Woodcroft Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 612 days.

(21) Appl. No.: 10/079,598

(22) Filed: Feb. 19, 2002

(65) Prior Publication Data

US 2002/0116345 A1    Aug. 22, 2002

(30) Foreign Application Priority Data

Feb. 20, 2001    (GB) ................. 0104136.7

(51) Int. Cl.
*G06Q 99/00*    (2006.01)

(52) U.S. Cl. .................. 705/76; 705/65; 705/67; 705/75; 705/35; 705/39; 705/40; 705/41; 705/44; 705/16; 455/74; 455/95; 235/379; 235/382.5

(58) Field of Classification Search ............... 705/16, 705/34–44, 64–80; 455/73, 74, 95; 235/379–382.5
See application file for complete search history.

(56) References Cited

U.S. PATENT DOCUMENTS

| | | | | |
|---|---|---|---|---|
| 5,870,456 | A * | 2/1999 | Rogers ................ | 379/91.01 |
| 5,878,337 | A | 3/1999 | Joao et al. ................ | 455/406 |
| 5,996,076 | A * | 11/1999 | Rowney et al. ............ | 713/201 |
| 6,023,688 | A * | 2/2000 | Ramachandran et al. ..... | 705/44 |
| 6,064,990 | A | 5/2000 | Goldsmith ............... | 705/75 |
| 6,598,790 | B1 * | 7/2003 | Horst ................... | 235/383 |
| 2002/0017556 | A1 * | 2/2002 | Putman et al. ............ | 235/379 |
| 2002/0184131 | A1 * | 12/2002 | Gatto ................... | 705/36 |
| 2003/0149662 | A1 * | 8/2003 | Shore ................... | 705/39 |
| 2004/0006657 | A1 * | 1/2004 | Wagner ................. | 710/1 |
| 2004/0199467 | A1 * | 10/2004 | Martin, Jr. et al. ......... | 705/43 |

FOREIGN PATENT DOCUMENTS

| | | | |
|---|---|---|---|
| EP | 1067492 | * | 2/2001 |
| GB | 2242048 | A | 9/1991 |
| GB | 2289783 | A | 11/1995 |
| GB | 2333209 | A | 7/1999 |

OTHER PUBLICATIONS

Curtis et al., "Securing the Global, Remote, Mobile User", International Journal of Network Management.*

* cited by examiner

*Primary Examiner*—James P. Trammell
*Assistant Examiner*—Jalatee Worjloh

(57) ABSTRACT

A mobile communication device, such as a mobile phone, which comprises a processor which is configured to process requests for authorisation of use of a credential, such as a credit card, and the processor causes the device to emit a signal, such as an audible intermittent tone, the characteristics of which are indicative of the deemed importance of a particular use of the credential.

Advantageously the owner of the device is alerted to the deemed importance of a use of a credential. For example, an intermittent tone of characteristic frequency is emitted by a mobile phone in relation to the monetary value of a transaction using a credit card.

20 Claims, 4 Drawing Sheets

APPARATUS FOR CREDENTIAL AUTHORISATION

The present invention relates to apparatus for credential authorisation, and is particularly, but not exclusively, relevant to mobile phones which are adapted to receive and process requests for authorisation of use of a credential.

BACKGROUND OF THE INVENTION

Where a user interface device, such as a mobile phone, has been configured to receive and process requests for authorisation of use of a credential, such as a credit card, it has been realised that it would be desirable to alert the person who controls the mobile phone to the pending transaction by means of a signal which is emitted by the phone which is indicative of the monetary value, say, of the transaction. The control of the provision of authorisation for use of the credential is thus facilitated.

The term credential is used herein to denote any means which provides prima facie authority for entitlement to do something, for example a credit or debit card paying for goods or a pass card or PIN for entering a particular region of a building.

SUMMARY OF THE INVENTION

According to a first aspect of the invention there is provided a user interface device which comprises a computer, the computer being configured to process requests for use of a credential which are transmitted to the device and the device being such that in use the computer is operative to cause the device to emit an alerting signal on receipt of a request for authorisation for use of the credential and the emitted alerting signal being indicative of the deemed importance of a particular use of a credential.

The term 'computer' is used herein to mean any device which accepts an input, processes that input in accordance with pre-defined rules and producing an output.

The computer is preferably operative to process information contained in the request so that the alerting signal emitted possesses characteristics which indicate the deemed importance of the use of a credential for which authorisation is sought.

The device preferably stores characteristics of an array of alerting signals, each alerting signal corresponding to a particular use of credential.

The alerting signal emitted by the device may be an intermittent audible signal, the frequency of which increases with increasing deemed importance of use of credential.

The user interface device is most preferably a portable communication device.

According to a second aspect of the invention there is provided a method of operating a user interface device in response to information received by the device relating to a request for authorisation of use of a credential, the device comprising a computer and the computer being configured such that in use the computer causes the device to emit an alerting signal which is indicative of the deemed importance of a particular use of a credential.

According to a third aspect of the invention there is provided a mobile phone, the mobile phone comprising a processor which is operative in use to process information transmitted to the phone relating to a request for authorisation of use of a credential and emit an audible alerting signal which is indicative of the deemed importance of the use of the credential for which authorisation is sought.

According to a fourth aspect of the invention there is provided a telecommunications device comprising a computer, a data storage device and an alerting device, the telecommunications device being adapted to receive signals representative of a request for authorisation of use of a credential, the computer device being adapted to compare data in a received signal representative of a request for authorisation with criteria data stored in the data storage device and consequently determine whether to activate the alerting device.

According to a fifth aspect of the invention there is provided a network, the network comprising a router and a telecommunications device, the router comprising a data storage device which has stored therein identification data of a credential and a telecoms address of the telecommunications device, the telecommunications device comprising a computer, a data storage device and an alerting device, the network being such that in use the router transmits to the telecommunications device a signal which is representative of a request for authorisation of use of a credential, the computer being adapted to compare data in said signal with criteria data stored in the data storage device of the telecommunications device, and consequently determine whether to activate the alerting device.

BRIEF DESCRIPTION OF THE DRAWINGS

The invention will now be further described, by way of example only, with reference to the accompanying drawings in which.

DESCRIPTION OF THE PREFERRED EMBODIMENT

Figure 1:
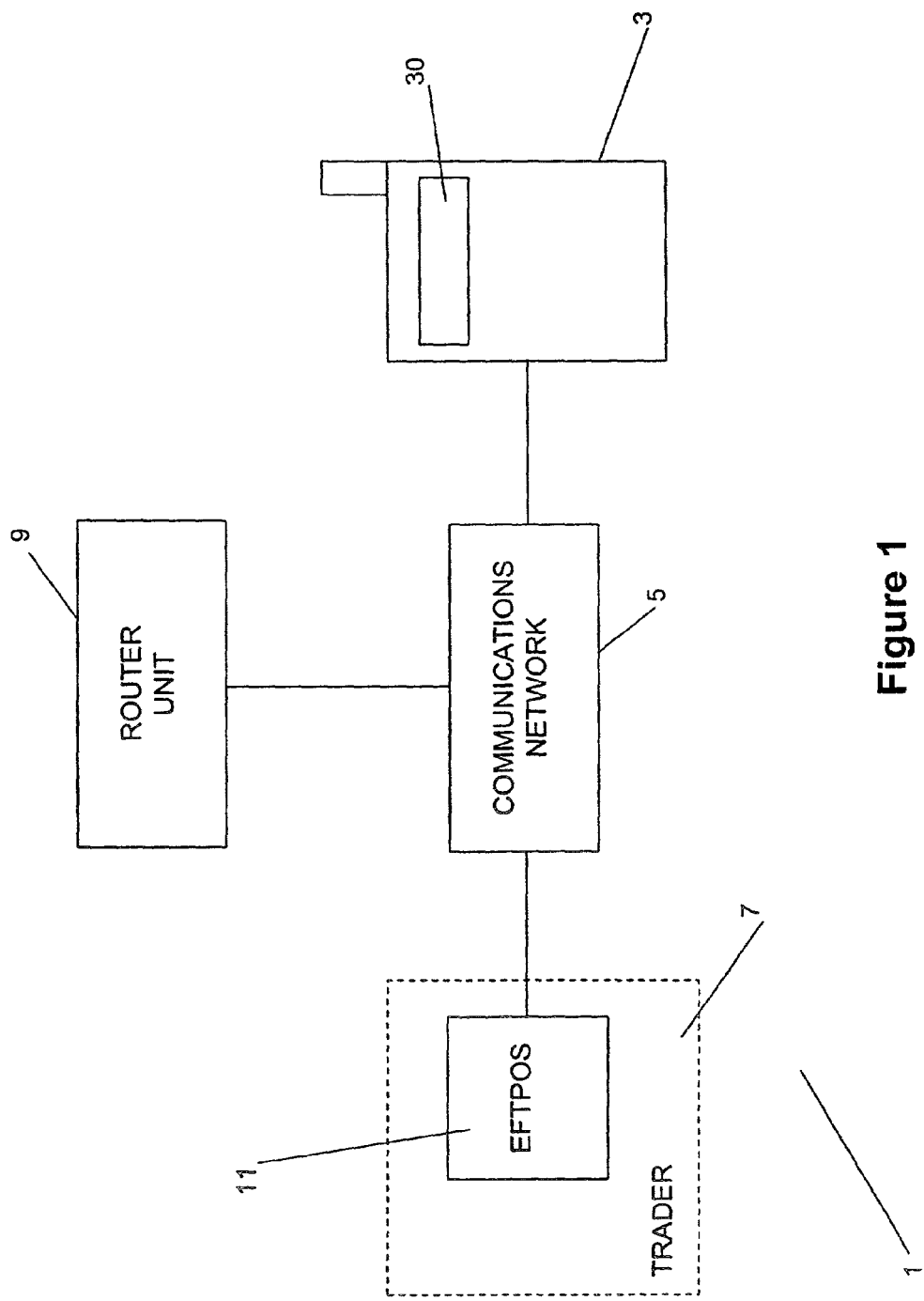
FIG. 1 is a schematic representation of a mobile phone configured in accordance with the invention in a system for receiving requests for authorisation of a credential.

With reference to FIG. 1 there is shown a system 1 comprising a mobile phone 3, a communication network 5, a router unit 9 and an Electronic Funds Transfer at Point of Sale (EFTPOS) unit 11 located at a trader 7.

Figure 2:
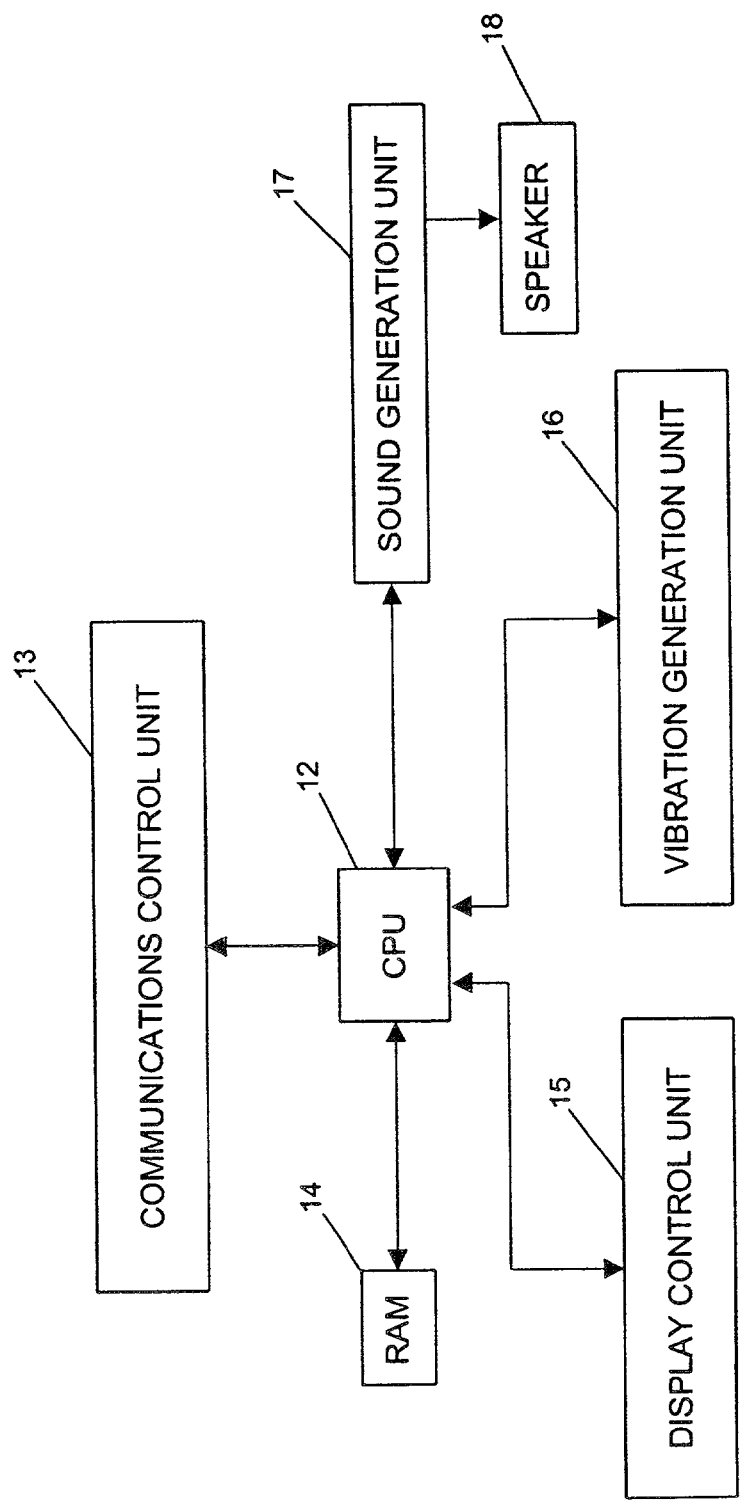
FIG. 2 is a block diagram of some of the components of the telephone shown in FIG. 1.

With reference to FIG. 2 the mobile phone 3 comprises a central processing unit (CPU) 12, a communications control unit 13, a random access memory (RAM) 14, a display control unit 15, a vibration generation unit 16, a sound generation unit 17 and a speaker 18. The communications control unit 13 comprises a transceiver and a decoder (not shown).

The telephone 3 is adapted to receive signals which are representative of a request for authorisation for a transaction using a credit card.

A person is designated as being the authoriser for transactions with a particular credit card (not shown), ie that person (the authoriser) is capable of authorising at least some transactions using the credit card in question.

The authoriser is provided with the mobile telephone 3 which he is able to program as follows.

The authoriser is initially prompted to input into the phone by way of a keypad of the telephone 3, when and how he would like to be alerted when a signal representative of a request for authorisation of a particular transaction is received. By way of a liquid crystal display (LCD) screen 30 of the telephone 3 the authoriser is prompted to enter at which monetary amount of transaction or between which transaction a amount range he would like to be alerted. For example, the authoriser may input that he would like to be alerted to a pending transaction the amount of which is between £50 and £100 inclusive. The authoriser is then prompted to chose the characteristics of the alert.

The user can be alerted to a pending transaction by way of one or a combination of the sound generation unit 17, the display control unit 15 and the vibration generation unit 16.

The authoriser programs the telephone 3 to emit an audible intermittent tone at a frequency of 1Hz and cause the vibration generation unit to be activated at the same frequency if a request for authorisation of an amount between £50 and £100 is received.

The authoriser then begins the process again and programs the telephone 3 to emit an audible intermittent tone of 3 Hz and simultaneously activate the vibration generation unit 16 if the amount of the pending transaction is greater than £100.

Figure 3:
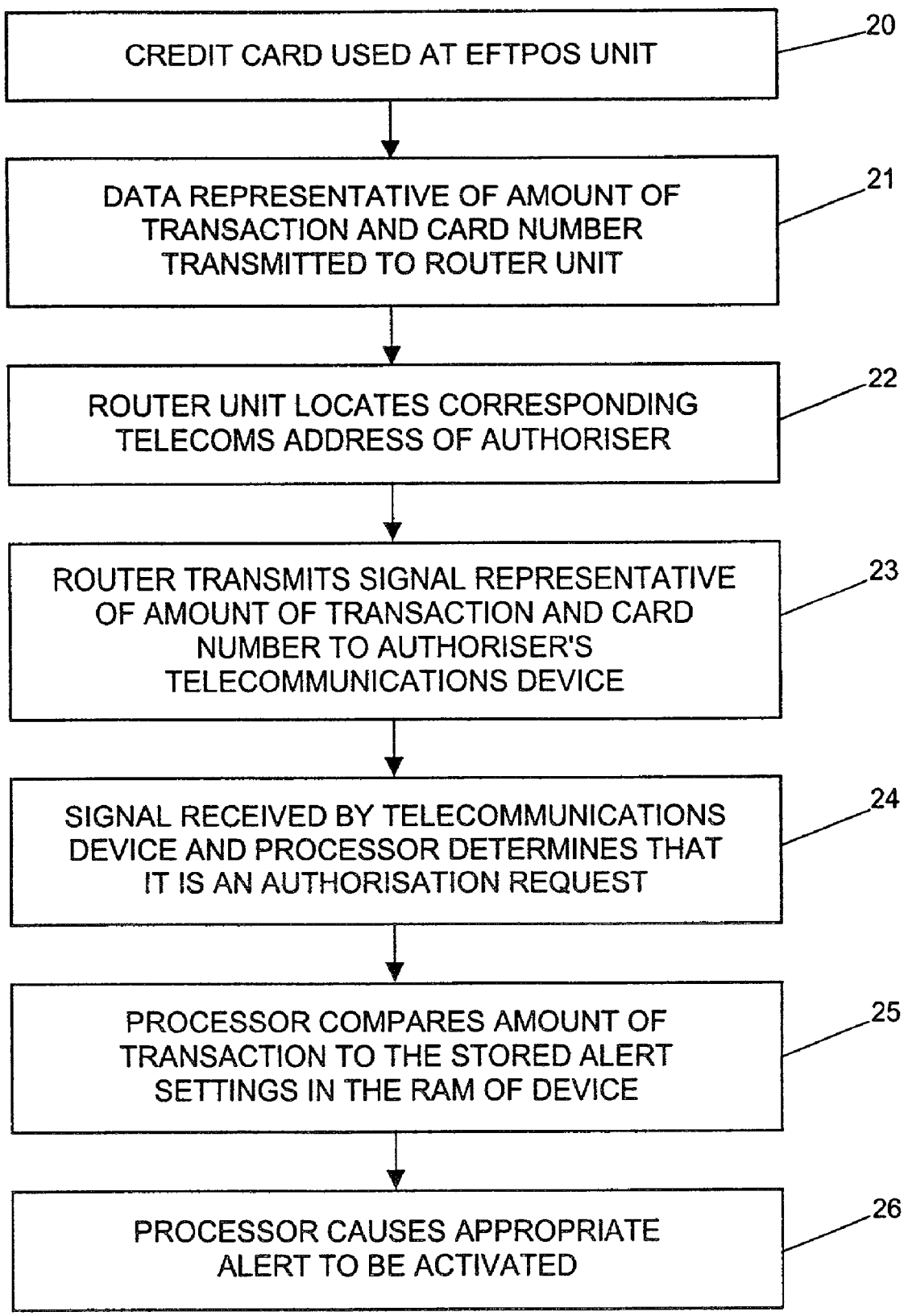
FIG. 3 is a flow diagram of an authorisation process executed by the system of FIG. 1.
Figure 4:
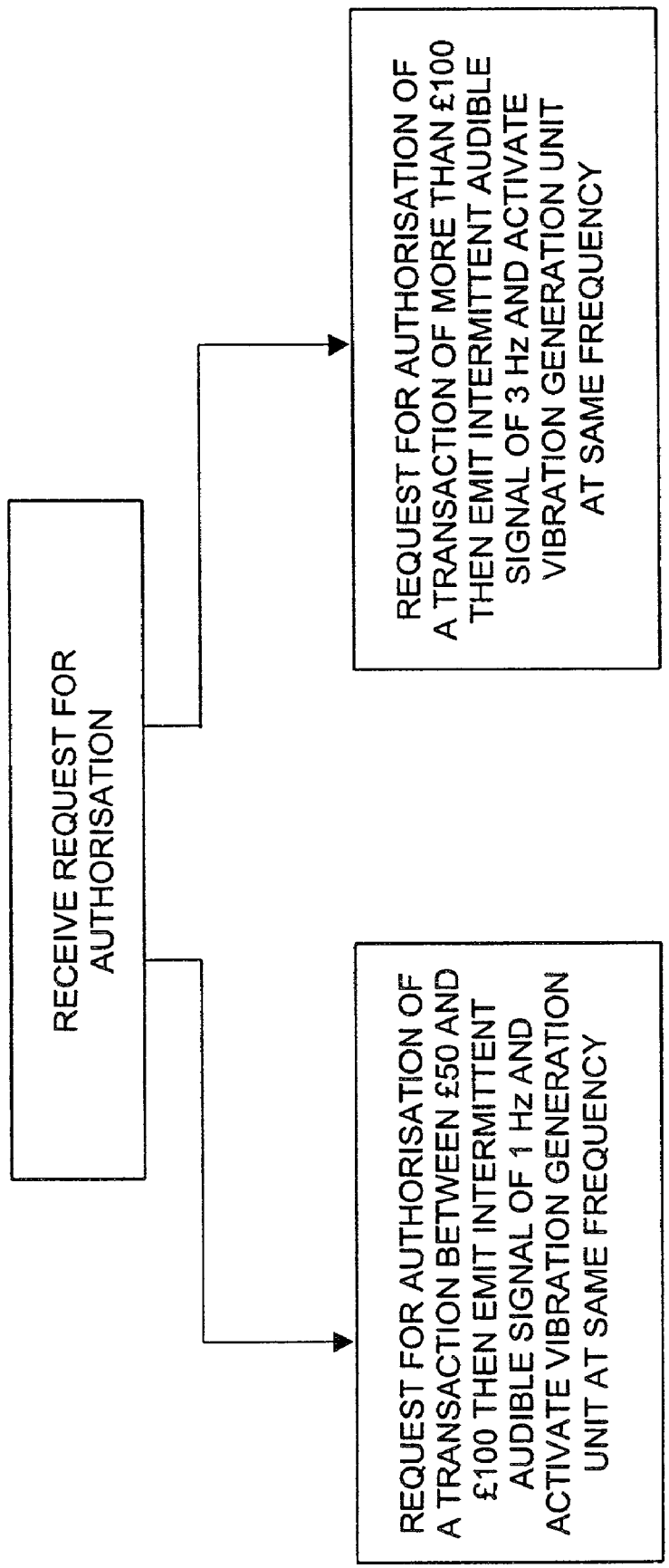
FIG. 4 is a flow diagram showing how the processor inside the mobile phone shown in FIG. 1 is programmed.

With particular reference to FIG. 3, the system 1 operates as follows. A person wishes to pay for goods having a value of £110 at the trader 7 with the aforementioned credit card (not shown). As shown at 20 and 21, on interfacing the card with the EFTPOS unit 11 details of the proposed transaction, including the number of the card and the amount of the transaction, are transmitted via the communications network to the router unit 9. The router unit 9 is a server which contains a database comprising telecoms addresses including mobile telephone numbers of authorisers who subscribe to the service provided by the system 1. The router unit 9 is operative to map a particular card number to a corresponding telecoms address as shown at 22. The details of the pending transaction are then forwarded as shown at 23 via the communications network 5 to the mobile phone 3 which is in the possession of the authoriser. As the skilled person will appreciate, any of a large number of conventional mechanisms for electronic payment can be used in conjunction with embodiments of the present invention—the significant aspect of the mechanism as regards the present invention is the provision of authentication by the user, and that is the only aspect of the mechanism considered in detail here.

On receiving the signal from the router unit 9 the communications control unit 13 and the CPU 12 of the telephone 3 processes said signal and determine that the signal relates to a request for authorisation for a transaction with the card in question. This is achieved by configuring the telephone 3 to recognise characteristic data which acts as a 'flag' to indicate to the telephone that it is such a signal.

As shown at 25 the CPU 12 then compares the alert settings which are stored in the RAM 14 by the authoriser with that part of the received signal which is representative of the amount of the transaction. Since the amount of the pending transaction is greater than £100 the sound generation unit 17 is operative to emit an intermittent tone at 3 Hz, and also to cause the vibration generation unit 16 to be activated at the same frequency.

When an alert is activated a back-lighting arrangement (not shown) of the display screen 30 is caused to flash and in so doing cause the display screen to be illuminated intermittently. The display screen 30 shows the text 'AUTHORISATION REQUEST RECEIVED'. In order to read details of the request the authoriser is required to depress a key on the keypad of the telephone 3. On doing so the sound generation unit and the vibration generation unit are deactivated as the display screen then shows the text "DO YOU WISH TO AUTHORISE A TRANSACTION FOR £110 ON CARD NUMBER 1234567?". The authoriser can then decide whether he wishes to authonse or deny the transaction by depressing the appropriate key on the keypad of the telephone 3. A signal representative of the decision of the authoriser is emitted from the telephone 3 via the communications network 5 to the EFTPOS.

Thus the system 1 advantageously allows for an authoriser to be alerted to the deemed importance of the transaction for which authorisation is sought since he knows that the frequency of the fine emitted is indicative of the value of the transaction.

The CPU 12 is thus readily programmable so that the characteristics of an alert can be set according to the authoriser's requirements and/or preferences. The telephone 3 may be configured to allow the authoriser to set such parameters as volume, frequency, tone and pitch of an audible alerting signal. The telephone 3 may be configured to allow the authoriser to select one of a plurality of pre-set alerting signals. The authoriser may be able to customise the characteristics of the pre-set alerting signals.

In another embodiment of the invention the system 1 is configured such that when a user interface device receives an authorisation request signal the authoriser has a predetermined time limit in which to deny authorisation, failing of which the transaction will be authorised by default.

In a further embodiment of the invention the authoriser is provided with more details about the transaction, for examples, place of transaction, nature of transaction (e.g., what type of goods are involved in the pending transaction).

Although use of mobile telephones has been specifically discussed, the present invention finds utility with any suitably configured user interface device which comprises a computer and which can communicate with a remote device which transmits authorisation request signals, for example a personal computer (PC) or a personal digital assistant (PDA).

Advantageously one embodiment of the present invention is configured to allow an authoriser to program his user interface device to emit respective alerting signals for each of a plurality of credentials for which the device adapted to receive requests for authorisation.

It will also be appreciated that the present invention also finds utility for security systems, such as where the use of pass cards for entry into various areas in a building is required. The invention is also applicable to requests for authorisation of the use of passwords for access to databases.

The invention claimed is:

1. A user interface device which comprises:
  a communications control unit being configured to receive a communication having information indicating at least one request for authorisation for use of a credential and indicating a monetary amount associated with the use of the credential, and wherein the communication is initiated by an electronic funds transfer point of sale (EFTPOS) device where the credential is being used for a transaction, the EFTPOS device being remote from the user interface device such that the communication is sent to the user interface device in response to use of the credential at the remote EFTPOS; and
  a computer, the computer being configured to process the requests for use of the credential which are transmitted to the user interface device, and the user interface device being such that in use the computer is operative to cause the user interface device to emit an alerting signal on receipt of the request for authorisation for use of the credential and the emitted alerting signal being indicative of the deemed importance of a particular use of the credential, wherein characteristics of the emitted alerting signal are customizable by a user, customizable characteristics including a specification of a range of monetary amounts within a request for authorisation that causes the alerting signal to be emitted at a tone selected by the user.

2. A user interface device as claimed in claim 1, in which the computer is operative to process information contained in the request so that the alerting signal emitted possesses characteristics which indicate the deemed importance of the use of a credential for which authorisation is sought.

3. A user interface device as claimed in claim 2, in which the device stores characteristics of an array of alerting signals, each alerting signal corresponding to a use of credential having a particular deemed importance.

4. A user interface device as claimed in claim 1, in which the alerting signal emitted by the device is an intermittent audible signal the frequency of which increases with increasing deemed importance of use of credential.

5. A user interface device as claimed in claim 1 which is a portable communication device.

6. A mobile phone, the mobile phone comprising:
   a communications control unit which is operative in use to receive a communication having information indicating a use of a credential and indicating a monetary amount associated with the use of the credential, and wherein the communication is initiated by a remote electronic funds transfer point of sale (EFTPOS) device where the credential is being used for a transaction, such that the communication is sent to the mobile phone in response to use of the credential at the EFTPOS; and
   a processor which is operative in use to process information transmitted to the phone relating to a request for authorisation of use of the credential and to cause the phone to emit an audible alerting signal which is indicative of the deemed importance of the use of the credential for which authorisation is sought, wherein characteristics of the emitted alerting signal are customizable by a user, customizable characteristics including a specification of a range of monetary amounts within a request for authorisation that causes the alerting signal to be emitted at a tone selected by the user.

7. The mobile phone as claimed in claim 6, wherein the credential is a credit card.

8. A mobile phone as claimed in claim 6, wherein the credential is a debit card.

9. A telecommunications system comprising:
   a data storage device that stores criteria data representative of a first transaction amount range;
   a telecommunications device being adapted to receive signals representative of a request for authorisation of use of a credential, the signals indicating at least a monetary amount associated with the use of the credential;
   a computer being adapted to compare the monetary amount in the received signal representative of the request for authorisation with the criteria data stored in the data storage device and consequently activates an alerting device when the monetary amount is within the first transaction amount range, wherein the first transaction amount range and a tone of an alert signal emitted by the alerting device when the monetary amount is within the first transaction amount range are set by a user.

10. A telecommunication system as claimed in claim 9, wherein the data storage device further stores criteria data representative of a second transaction amount range, and wherein the computer activates the alerting device to emit a first signal when the monetary amount is within the first transaction amount range, and wherein the computer activates the alerting device to emit a different second signal when the monetary amount is within the first transaction amount range.

11. A telecommunication system as claimed in claim 10, wherein the alerting device comprises a sound generation unit, such that the first signal emitted by the sound generation unit is an audible intermittent tone of a first frequency, and such that the second signal emitted by the sound generation unit is another audible intermittent tone of a second frequency.

12. A telecommunication system as claimed in claim 10, wherein the alerting device comprises a vibration generation unit, such that the first signal emitted by the vibration generation unit is a vibration of a first frequency, and such that the second signal emitted by the vibration generation unit is another vibration of a second frequency.

13. A telecommunication system as claimed in claim 10, further comprising a display screen, such that when a user depresses a key of the telecommunication system, the alerting device is deactivated and information corresponding to at least the monetary amount associated with the use of the credential is displayed on the display screen, and such that the transaction can be authorised or denied by depressing an appropriate key of the telecommunication system.

14. A network, the network comprising a router and a telecommunications device,
   the router comprising:
      a first data storage device which has stored therein identification data of a credential and a telecoms address of the telecommunications device,
   the telecommunications device comprising:
      a computer;
      a second data storage device storing a transaction amount range; and
      an alerting device,
   the network being such that in use the router transmits to the telecommunications device a signal which is representative of a request for authorisation of use of the credential and comprising information corresponding to at least a monetary amount associated with the use of the credential, the computer being adapted to compare the monetary amount in the signal with criteria data stored in the second data storage device, and consequently activate the alerting device when the monetary amount is within the transaction amount range, wherein the transaction amount range and a tone of an alert signal emitted by the alerting device when the monetary amount is within the transaction amount range are set by a user.

15. A network as claimed in claim 14, wherein the credential is a credit card.

16. A network as claimed in claim 14, wherein the credential is a debit card.

17. A method of operating a user interface device in response to information received by the user interface device relating to a request for authorisation of use of a credential, comprising:
   receiving an authorisation request signal requesting authorisation of use of the credential, the authorisation request signal indicating at least a monetary amount associated with the use of the credential;

comparing the monetary amount with a first transaction amount range, the first transaction amount range predefined by a user who is authorised to permit or deny use of the credential, and wherein the first transaction amount range is stored in a memory residing in the user interface device; and activating an alerting device to emit an audible intermittent tone of a first frequency when the monetary amount is within the first transaction amount range, wherein the first frequency is set by the user and is associated with the first transaction amount range.

18. A method of operating a user interface device as claimed in claim 17, further comprising:

comparing the monetary amount with a second transaction amount range, the second transaction amount range predefined by a user who is authorised to permit or deny use of the credential, and wherein the second transaction amount range is stored in the memory residing in the user interface device and is different from the first transaction amount range; and activating the alerting device to emit another audible intermittent tone of a second different frequency when the monetary amount is within the second transaction amount range.

19. A method of operating a user interface device as claimed in claim 17, further comprising:

deactivating the alerting device when the user depresses a key of a telecommunication system; and displaying to the user information corresponding to at least the monetary amount associated with the use of the credential on a user interface device display, such that the transaction can be authorised or denied by the user by depressing an appropriate key of the user interface device.

20. A method of operating a user interface device as claimed in claim 17, further comprising:

authorising use of the credential when the user depresses an appropriate key; and denying use of the credential when the user depresses another appropriate key.

* * * * *